(12) United States Patent
Datta et al.

(10) Patent No.: US 8,429,418 B2
(45) Date of Patent: Apr. 23, 2013

(54) TECHNIQUE FOR PROVIDING SECURE FIRMWARE

(75) Inventors: Shamanna M. Datta, Hillsboro, OR (US); Mohan J. Kumar, Aloha, OR (US)

(73) Assignee: Intel Corporation, Santa Clara, DC (US)

(*) Notice: Subject to any disclaimer, the term of this patent is extended or adjusted under 35 U.S.C. 154(b) by 945 days.

(21) Appl. No.: 11/355,697

(22) Filed: Feb. 15, 2006

(65) Prior Publication Data

US 2007/0192611 A1    Aug. 16, 2007

(51) Int. Cl.
*G06F 21/00* (2006.01)
(52) U.S. Cl.
USPC ............. 713/189; 713/176; 713/190; 726/22
(58) Field of Classification Search .................... 726/22; 713/176, 189, 190
See application file for complete search history.

(56) References Cited

U.S. PATENT DOCUMENTS

| | | | |
|---|---|---|---|
| 5,421,006 A | | 5/1995 | Jablon |
| 6,101,255 A * | | 8/2000 | Harrison et al. ............. 380/52 |
| 6,263,431 B1 * | | 7/2001 | Lovelace et al. ............ 713/2 |
| 6,745,307 B2 * | | 6/2004 | McKee ..................... 711/163 |
| 6,748,538 B1 * | | 6/2004 | Chan et al. ................. 713/176 |
| 7,484,099 B2 * | | 1/2009 | Bade et al. ................. 713/176 |
| 2003/0140238 A1 * | | 7/2003 | Turkboylari ............... 713/193 |
| 2004/0003321 A1 | | 1/2004 | Glew et al. |
| 2004/0030877 A1 * | | 2/2004 | Frid ........................... 713/1 |
| 2004/0064457 A1 | | 4/2004 | Zimmer |
| 2004/0103273 A1 | | 5/2004 | Goud et al. |
| 2004/0133777 A1 * | | 7/2004 | Kiriansky et al. ........... 713/166 |
| 2005/0021968 A1 * | | 1/2005 | Zimmer et al. ............. 713/176 |
| 2005/0108564 A1 | | 5/2005 | Freeman |
| 2005/0198517 A1 * | | 9/2005 | Ivanov et al. ............... 713/187 |
| 2006/0010326 A1 * | | 1/2006 | Bade et al. ................. 713/176 |
| 2006/0230401 A1 * | 10/2006 | Grawrock ................... 718/1 |

FOREIGN PATENT DOCUMENTS

| | | |
|---|---|---|
| EP | 0816970 A2 | 1/1998 |
| WO | 2007/095385 A2 | 8/2007 |
| WO | 2007/095385 A3 | 4/2008 |

OTHER PUBLICATIONS

What is virtual machine (VM)?—Definition from Whatis.com., (Jul. 2007), pp. 1-11 [online], [retrieved on Dec. 29, 2011]. Retrieved from the Internet <http://searchservervirtualization.techtarget.com/definition/virtual-machine>.*

What is virtual machine monitor (VMM)?—Definition from Whatis.com., (May 2006), pp. 1-11 [online], [retrieved on Dec. 29, 2011]. Retrieved from the Internet <http://searchservervirtualization.techtarget.com/definition/virtual-machine-monitor>.*

Intel Corporation; Intel® Itanium® Processor Family System Abstraction Layer Specification;Dec. 2003; Document No. 245359-007.

Office Action Received for Chinese Patent Application No. 200780003174.1, mailed on Aug. 14, 2009, 9 pages of English Translation and 8 pages of Office Action.

(Continued)

*Primary Examiner* — Justin T Darrow
(74) *Attorney, Agent, or Firm* — Thomas R. Lane

(57) ABSTRACT

A technique to verify firmware. One embodiment of the invention uses a processor's micro-code to verify a system's firmware, such that the firmware can be included in a trusted chain of code along with the operating system.

2 Claims, 4 Drawing Sheets

OTHER PUBLICATIONS

Office Action Received for Chinese Patent Application No. 200780003174.1, mailed on May 28, 2010, 9 pages of English Translation and 7 pages of Office Action.

Office Action Received for German Patent Application No. 112007000363.4, mailed on Apr. 9, 2009, 2 pages of English Translation and 2 pages of Office Action.

Office Action Received for German Patent Application No. 112007000363.4, mailed on Apr. 27, 2010, 2 pages of English Translation and 2 pages of Office Action.

International Search Report and Written Opinion received for PCT Patent Application No. PCT/US2007/004211, mailed on Feb. 20, 2008, 15 pages.

International Preliminary Report on Patentability received for PCT Patent Application No. PCT/US2007/004211, mailed on Aug. 28, 2008, 9 pages.

Office Action Received for Taiwanese Patent Application No. 96105224, mailed on Mar. 3, 2011, 10 pages of Taiwanese Office Action, partial English translation included.

Office Action Received for Taiwanese Patent Application No. 96105224, mailed on Oct. 20, 2011, 5 pages of Taiwanese Office Action, partial English translation included.

* cited by examiner

TECHNIQUE FOR PROVIDING SECURE FIRMWARE

FIELD

Embodiments of the invention relate to microprocessors and microprocessor systems. More particularly, embodiments of the invention pertain to a technique to provide software security in a microprocessor system.

BACKGROUND

Software security in microprocessor systems typically involves verifying the authenticity, accuracy, etc., of several layers of code in a software stack, including the operating system (OS) and applications that run within the operating system. Microprocessors and microprocessor systems, however, typically also include software that is specific to a particular computing system, such as "firmware", which can include software to perform basic input/output system (BIOS) routines. It may be desirable in some computing systems to verify the integrity of the firmware running within the system, since this firmware may be used by other functions within the OS or various applications and is therefore a vital part of the "trust chain" of verifiable software running in the system.

Prior art software security techniques may not verify the integrity of firmware within a computing system, particularly in a server system, because verifying firmware typically requires the system to be reset while system management operations verify the firmware. One prior art technique, in particular, attempts to measure and verify firmware without resetting the system by including the requisite system management operations within software stored in a portion of non-volatile memory (e.g., flash memory) that is responsible for booting the system (i.e., "boot block").

One problem with the above-mentioned prior art technique is that the boot block in some non-volatile memories may be accessible by a user and the code stored therein may be modified, thereby compromising the trust chain of software running the system. Another shortcoming of the prior art is that the prior art may require server systems to include a boot block. In a computing system, in which software integrity is at risk by malicious intruders, such as viruses, worms, etc., it is increasingly important to verify the integrity of software running therein, including firmware. Furthermore, in systems in which downtime may be undesirable, or even unacceptable, prior art security techniques are remiss in providing an acceptable software security solution.

BRIEF DESCRIPTION OF THE DRAWINGS

Embodiments of the invention are illustrated by way of example and not limitation in the figures of the accompanying drawings, in which like references indicate similar elements and in which.

DETAILED DESCRIPTION

Embodiments of the invention relate to microprocessors and microprocessor systems. More particularly, embodiments of the invention relate to software security within a computing system. At least one embodiment of the inventions provides a technique to verify the integrity of platform-specific code, such as BIOS or firmware (hereafter "firmware"), without powering down or otherwise resetting a computing system in which the code is used.

In one embodiment of the invention, firmware integrity may be verified at the time of reset at which time the firmware component may be measured by using processor-specific software (e.g., embedded "micro-code") to invoke a trusted code module (i.e., authenticated code module, or "ACM") that may verify the integrity of the firmware during a boot-up process of the system, before firmware modules are invoked. Processor micro-code is typically as trusted as processor hardware because it originates from only the processor manufacturer and like hardware is built into the silicon at the time of manufacture. Furthermore, processor micro-code is typically programmed into the processor ROM and can not be modified by external or internal agents. Hence, processor micro-code can be used as the lowest level of code upon which a trusted chain of code, including the OS, may be built In one embodiment, the ACM (Authenticated Code Module) may be a separate software module from the micro-code and/or the firmware, whereas in other embodiments, the AC may be a part of the micro-code or firmware.

By verifying the security of the firmware at boot time, the firmware is included in the trust chain of software running in the system, such that subsequently run software, such as the OS, can rely on the integrity of the underlying firmware, thereby creating a trusted chain of software from the firmware layer to the OS to the applications running within the OS. Furthermore, embodiments of the invention can create a trusted chain of system software from the firmware layer through the OS and application layers of the system software stack without requiring the system to be rebooted or otherwise powered down after the trusted chain is established. This may be particularly useful in server applications, which cannot tolerate system downtime.

By extending the trust chain from the microcode to all firmware components to the OS, one embodiment enables the firmware to be successfully integrated into the trust domain of a trusted OS. As a result, the trusted OS can use platform firmware to accomplish various functions, such as reliability, availability, and serviceability (RAS) platform management tasks.

Figure 1:
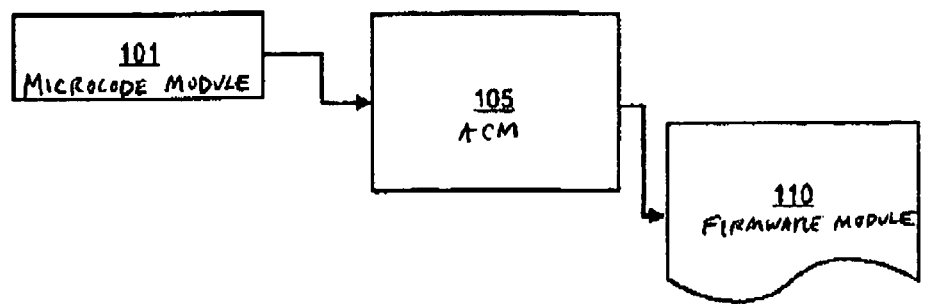
FIG. 1 is a diagram illustrating various software components that may used in conjunction with one embodiment of the invention.

FIG. 1 illustrates several software modules that may be used in at least one embodiment of the invention. In other embodiments, one or more these modules may be combined or omitted altogether. Referring to FIG. 1, micro-code module 101, in one embodiment, communicates with an embedded table inside firmware module 110 (firmware interface table or "FIT"). In one embodiment, the micro-code module 101 is located at an architectural address (e.g., 4 GB-0x18) and searches the FIT records to determine whether an AC module (105) is registered in it. If an FIT is not found, the microcode may abandon the trusted mode boot and will instead invoke the a reset vector at a location, such as 4 GB-0x10, used in certain "legacy" processors. If the FIT is present and an AC module is registered in it and the record passes all the integrity tests, then micro-code can invoke the AC module by loading it into the processor secure environment (e.g., called caches as RAM or "CRAM" address space).

In one embodiment, the three modules are located in different locations within the computing system. For example, in one embodiment, the micro-code is programmed into micro-code ROM (read only memory) logic within a processor, the ACM may be located in a non-volatile memory (e.g., flash memory), and the firmware is stored in a non-volatile memory (e.g., flash memory) or other memory in a storage device within the computing system.

In one embodiment of the invention, the ACM includes a routine or routines to perform a security verification operation on the firmware, such as a SHA-2 hash function or other security function. The result of the verification routine, such as the hash function, may be a value or set of values that represent a secure identity of the firmware to be verified or authenticated. This value or values may be stored in a location, such as a platform configuration register (PCR) within a secure hardware component, such as a trusted platform module (TPM 1.2) used by the trusted chain of system code. Later on, the secure OS can hash the module again and the result value of the hashing function may be compared against an expected value or values to verify the integrity of the firmware.

In one embodiment, the AC is stored in a non-volatile memory location, such as on a disk or in flash memory, and copied into a cache memory or other relatively fast-access and secure storage location, from where it may be executed by a processor. Some processors may execute AC modules from a special mode called "CRAM mode" (Caches As RAM Mode), in which the ACM is loaded into the processor cache and is executed securely. No other executing agent can modify the ACM when it is executing from CRAM mode. The exact location of the AC is somewhat arbitrary, particularly in some embodiments that use a firmware interface table (FIT) or other structure that can identify the location of the AC.

Figure 2:
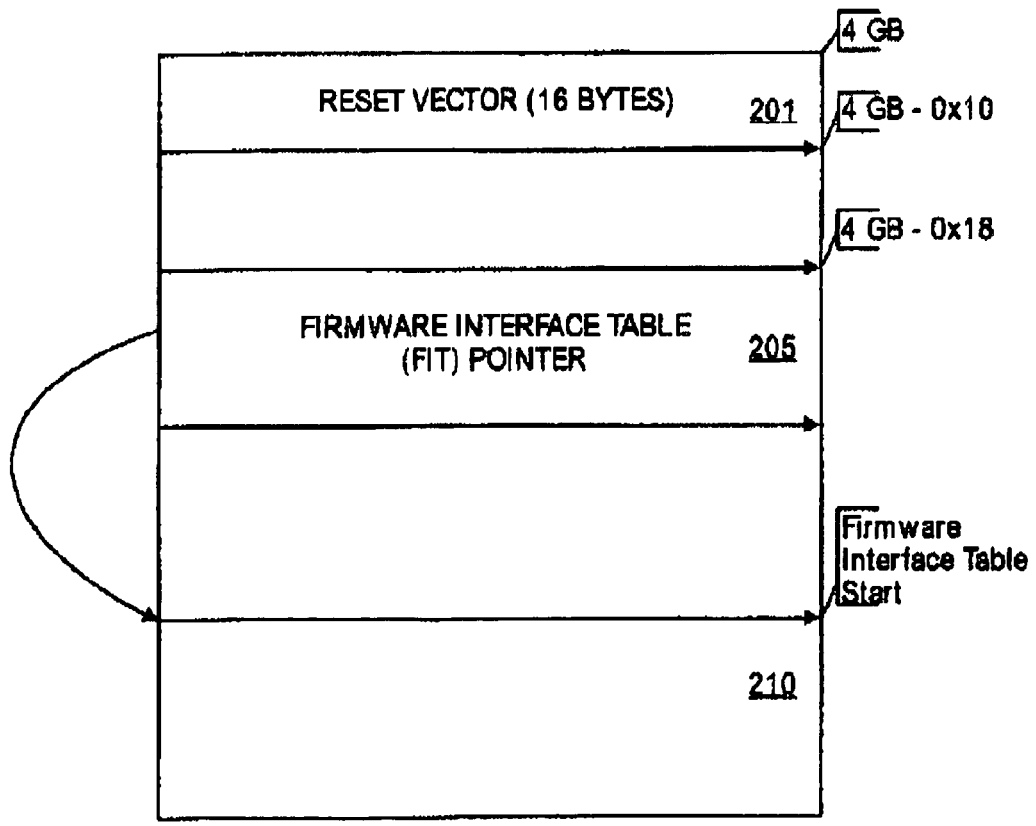
FIG. 2 is a diagram illustrating a system memory map including a firmware interface table (FIT) according to one embodiment of the invention.

FIG. 2 illustrates a system memory map containing a pointer to a firmware interface table (FIT), according to one embodiment. The FIT may contain, among other values, a pointer to an AC module to be used to verify the firmware in one embodiment. The system memory map of FIG. 2 contains, among other things, a reset pointer 201 at the 4 GB boundary containing the address of where a program counter of a processor is to start executing code at boot-up. Also contained in the system memory map of FIG. 2 is a pointer 205 to a FIT, stored in memory, which contains a pointer 210 to an AC module to be used to verify the firmware. In the memory map of FIG. 2, for example, the pointer to the FIT is stored at the 4 GB+18 B boundary, which contains a pointer to the FIT stored elsewhere in memory.

In one embodiment, micro-code of a processor may initially cause the processor to read the information stored at the 4 GB-0x18 location, which contains a pointer to the start of the FIT. The processor may read out of the FIT, to find out details of all the FIT registered modules. Among other things, a pointer to an AC module containing a verification routine (e.g., hash function) to verify the firmware of the system. Both the FIT and the AC module may be stored in memory that is contiguous or non-continuous, and may be stored in any memory location within the system.

Advantageously, in one embodiment of the invention micro-code updates, or "patches", can be implemented by updating the FIT to point to the appropriate patch or update at reset time. In this way, micro-code can be upgraded or repaired before calling other high-level code such that the trusted chain of code is not disrupted.

Figure 3:
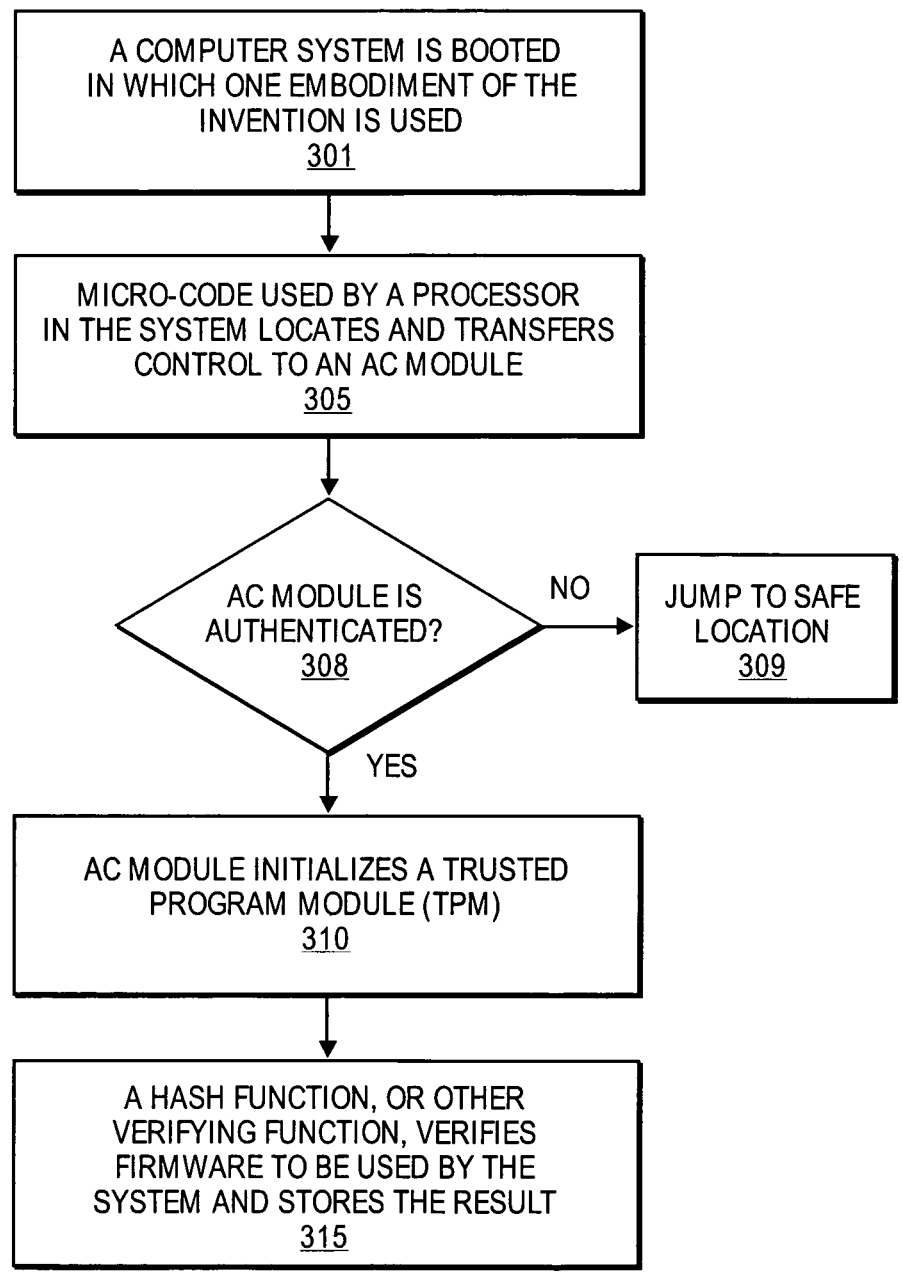
FIG. 3 is a flow diagram illustrating operations used in one embodiment of the invention.

FIG. 3 is a flow diagram illustrating operations that may be used in some embodiments of the invention. At operation 301, a computer system is booted, in which one embodiment of the invention is used. At operation 305, micro-code used by a processor in the system locates and transfers control to an AC module. In one embodiment, the micro-code locates the AC module by referencing a FIT, which contains a pointer to the AC module. In other embodiments, other structures may be used to locate the AC module. If the micro-code is unable to find the FIT or if the AC module is not found, in one embodiment, the micro-code may jump to a "safe" location in program order, such as 0xfffff 0.

At operation 308, the AC module is authenticated. In one embodiment, this may be done through prior art means, (e.g., loading the module to internal CRAM and authenticating it using microcode based hashing function and a CPU stored key. If the AC module passes this authentication, then processor will execute it.) and if the AC module cannot be verified, the micro-code may jump to a "safe" location in program order, such as 0xfffff 0, at operation 309. In one embodiment, program control may jump to a similar address if the FIT cannot be located or if the firmware cannot be verified. At operation 310, the AC module initializes a trusted program module (TPM), which contains information used by the system in relation to the trusted chain of software. At operation 315, a hash function, or other verifying function, verifies firmware to be used by the system and extends this hash into PCR of the trusted platform module (TPM). In one embodiment, the result of a hashing function is stored in a platform control register associated with the system. In other embodiments, the result may be stored in other locations, which are secure and not alterable by any other agents. The hashing operation, in one embodiment, continues to verify modules of the firmware until all the firmware has been verified, at which time other trusted software in the system, such as the secure (trusted) OS, may boot.

Figure 4:
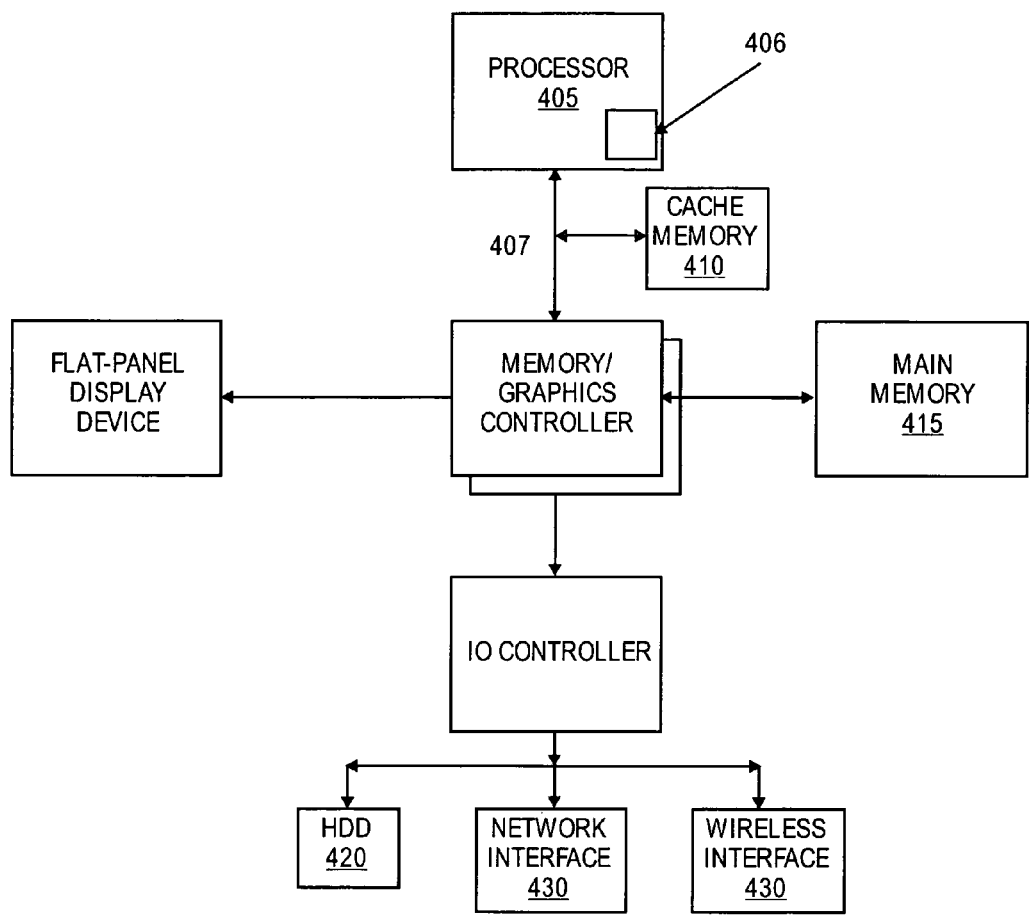
FIG. 4 is a front-side bus computing system in which one embodiment of the invention may be used.

FIG. 4 illustrates a front-side-bus (FSB) computer system in which one embodiment of the invention may be used. A processor 405 accesses data from a level one (L1) cache memory 410 and main memory 415. In other embodiments of the invention, the cache memory may be a level two (L2) cache or other memory within a computer system memory hierarchy. Furthermore, in some embodiments, the computer system of FIG. 4 may contain both a L1 cache and an L2 cache.

Illustrated within the processor of FIG. 4 is a storage area 406 for machine state. In one embodiment storage area may be a set of registers, whereas in other embodiments the storage area may be other memory structures. Also illustrated in FIG. 4 is a storage area 407 for save area segments, according to one embodiment. In other embodiments, the save area segments may be in other devices or memory structures. The processor may have any number of processing cores. Other embodiments of the invention, however, may be implemented within other devices within the system, such as a separate bus agent, or distributed throughout the system in hardware, software, or some combination thereof.

The main memory may be implemented in various memory sources, such as dynamic random-access memory (DRAM), a hard disk drive (HDD) 420, or a memory source located remotely from the computer system via network interface 430 containing various storage devices and technologies. The cache memory may be located either within the processor or in close proximity to the processor, such as on the processor's local bus 407.

Figure 5:
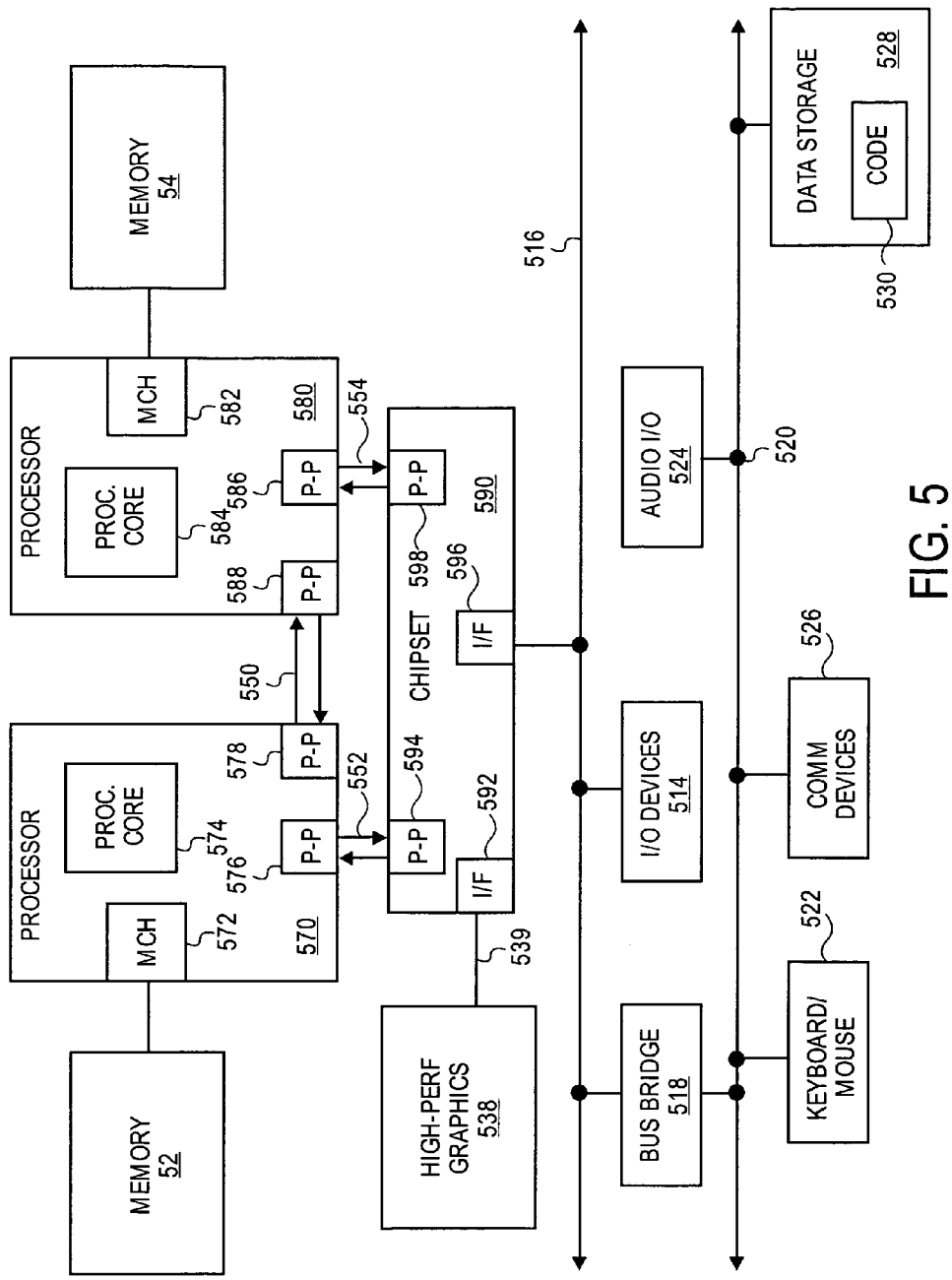
FIG. 5 is a point-to-point bus computing system in which one embodiment of the invention may be used.

Furthermore, the cache memory may contain relatively fast memory cells, such as a six-transistor (6T) cell, or other memory cell of approximately equal or faster access speed. The computer system of FIG. 4 may be a point-to-point (PtP) network of bus agents, such as microprocessors, that communicate via bus signals dedicated to each agent on the PtP network. FIG. 5 illustrates a computer system that is arranged in a point-to-point (PtP) configuration. In particular, FIG. 5 shows a system where processors, memory, and input/output devices are interconnected by a number of point-to-point interfaces.

The system of FIG. 5 may also include several processors, of which only two, processors 570, 580 are shown for clarity. Processors 570, 580 may each include a local memory controller hub (MCH) 572, 582 to connect with memory 22, 24. Processors 570, 580 may exchange data via a point-to-point (PtP) interface 550 using PtP interface circuits 578, 588. Processors 570, 580 may each exchange data with a chipset 590 via individual PtP interfaces 552, 554 using point to point interface circuits 576, 594, 586, 598. Chipset 590 may also exchange data with a high-performance graphics circuit 538 via a high-performance graphics interface 539. Embodiments of the invention may be located within any processor having any number of processing cores, or within each of the PtP bus agents of FIG. 5.

Other embodiments of the invention, however, may exist in other circuits, logic units, or devices within the system of FIG. 5. Furthermore, in other embodiments of the invention may be distributed throughout several circuits, logic units, or devices illustrated in FIG. 5.

Embodiments of the invention described herein may be implemented with circuits using complementary metal-oxide-semiconductor devices, or "hardware", or using a set of instructions stored in a medium that when executed by a machine, such as a processor, perform operations associated with embodiments of the invention, or "software". Alternatively, embodiments of the invention may be implemented using a combination of hardware and software.

While the invention has been described with reference to illustrative embodiments, this description is not intended to be construed in a limiting sense. Various modifications of the illustrative embodiments, as well as other embodiments, which are apparent to persons skilled in the art to which the invention pertains are deemed to lie within the spirit and scope of the invention.

What is claimed is:

1. A processor comprising:
   read-only memory storing micro-code to search, during a system boot-up process, a firmware interface table for the address of an authenticated code module to be executed by the processor to verify the integrity of a firmware module corresponding to a computer system before software is booted,
   wherein the authenticated code module includes a routine to perform a hashing function on the firmware module,
   wherein a result of the hashing function is to be compared to a value stored in a platform configuration register.

2. The processor of claim 1 further comprising a cache memory from which to execute the authenticated code module.

* * * * *